(12) United States Patent
Laflen et al.

(10) Patent No.: US 10,193,979 B2
(45) Date of Patent: Jan. 29, 2019

(54) SYSTEM ARCHITECTURE FOR WIRELESS METROLOGICAL DEVICES

(71) Applicant: GENERAL ELECTRIC COMPANY, Schenectady, NY (US)

(72) Inventors: John Brandon Laflen, Niskayuna, NY (US); Glen William Brooksby, Glenville, NY (US); Patrick Jay Biel, Cohoes, NY (US); Yakov Polishchuk, Niskayuna, NY (US); Steven William Wik, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 913 days.

(21) Appl. No.: 14/571,973

(22) Filed: Dec. 16, 2014

(65) Prior Publication Data
US 2016/0173608 A1    Jun. 16, 2016

Related U.S. Application Data

(60) Provisional application No. 61/954,182, filed on Mar. 17, 2014.

(51) Int. Cl.
*H04L 29/08* (2006.01)
*H04B 7/26* (2006.01)
*H04W 4/80* (2018.01)

(52) U.S. Cl.
CPC ............. *H04L 67/12* (2013.01); *H04B 7/26* (2013.01); *H04W 4/80* (2018.02)

(58) Field of Classification Search
CPC ........................................................ H04L 67/12
See application file for complete search history.

(56) References Cited

U.S. PATENT DOCUMENTS

| | | | |
|---|---|---|---|
| 6,735,494 B2 | 5/2004 | Wunder |
| 7,668,678 B2 | 2/2010 | Scott |
| 8,494,027 B2 | 7/2013 | Bulled et al. |
| 8,533,967 B2 | 9/2013 | Bailey et al. |
| 8,581,743 B2 | 11/2013 | Chan et al. |
| 8,630,314 B2 | 1/2014 | York |
| 8,639,390 B2 | 1/2014 | Tamarkin et al. |
| 2007/0008166 A1 | 1/2007 | Kovacik et al. |
| 2008/0004904 A1 | 1/2008 | Tran |

(Continued)

FOREIGN PATENT DOCUMENTS

WO    2008085916 A2    7/2008

OTHER PUBLICATIONS

International Search Report and Written Opinion issued in connection with corresponding PCT Application No. PCT/US2015/017009 dated May 18, 2015.

(Continued)

*Primary Examiner* — Manuel A Rivera Vargas
(74) *Attorney, Agent, or Firm* — GE Global Patent Operation; John P. Darling

(57) ABSTRACT

System architecture that provides computer-based methods of wireless communication between a wireless metrological device and a mobile computing device that includes the sending/receiving of data (e.g., measurements) along with a universal generic data service that includes data descriptor(s) affiliated with the measurements. The architecture and methods, which may be communicated via BLE, allow for uniform communication between tools and mobile computing devices regardless of tool type, manufacturer, and measurement information.

4 Claims, 5 Drawing Sheets

(56) References Cited

U.S. PATENT DOCUMENTS

2012/0078548 A1    3/2012    Salazar et al.
2012/0278035 A1   11/2012    Scott
2013/0241746 A1    9/2013    McKinley et al.

OTHER PUBLICATIONS

Mettala, "Bluetooth Protocol Architecture", Bluetooth Protocol Architecture, XX, XX, pp. 1-20, Aug. 25, 1999.
Shih et al., "An adaptive bluetooth packet selection and scheduling scheme in interference environments", Computer Communications, vol. 29, Issue No. 11, pp. 2084-2095, Jul. 26, 2006.
Betta et al., "Influence of Wi-Fi Computer Interfaces on RF Measurement Systems", IEEE International Conference on Virtual Environments, Human-Computer Interfaces and Measurement Systems, pp. 99-104, Jun. 2007.

SYSTEM ARCHITECTURE FOR WIRELESS METROLOGICAL DEVICES

CROSS REFERENCE TO RELATED APPLICATIONS

This application claims benefit of the Mar. 17, 2014 filing date of U.S. provisional patent application Ser. No. 61/954,182, the contents of which are hereby incorporated by reference in its entirety.

BACKGROUND OF THE INVENTION

The present invention relates generally to metrological devices and more particularly to system architecture for use with wireless metrological devices and to the concomitant methods of communication within the system architecture.

While wireless metrological systems currently exist, current systems have never provided a truly unified solution with the capabilities specified in this standard and architecture.

Accordingly, there is an ongoing need for improving upon wireless metrological systems, their methods of communication, and/or their system architecture.

BRIEF DESCRIPTION

According to one embodiment, a computer-based method by a wireless metrological device, the wireless metrological device including a wireless communication interface configured to communicate with at least one mobile computing device, the method comprises: receive a connection request from the at least one mobile computer device; send a connection confirmation to the at least one mobile computer device; respond to the at least one mobile computer with Device Information Service (DIS); acknowledge to the at least one mobile computer a universal generic data service; send a data descriptor to the at least one mobile device, wherein the data descriptor is affiliated with a measurement; and send a data packet comprising the measurement using the universal generic data service to the at least one mobile computing device.

According to one embodiment, a computer-based method by a mobile computing device, the mobile computing device including a wireless communication interface capable of communicating with at least one wireless metrological device, the method comprises: send a connection request to the at least one wireless metrological device; receive a connection confirmation from the at least one wireless metrological device; read Device Information Service; check for a generic data service from the at least one wireless metrological device; receive from the at least one wireless metrological device acknowledgement of the generic data service; receive from at least one wireless metrological device a data descriptor, wherein the data descriptor is affiliated with a measurement; receive the measurement via the generic data service; and decode and parse the received measurement.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
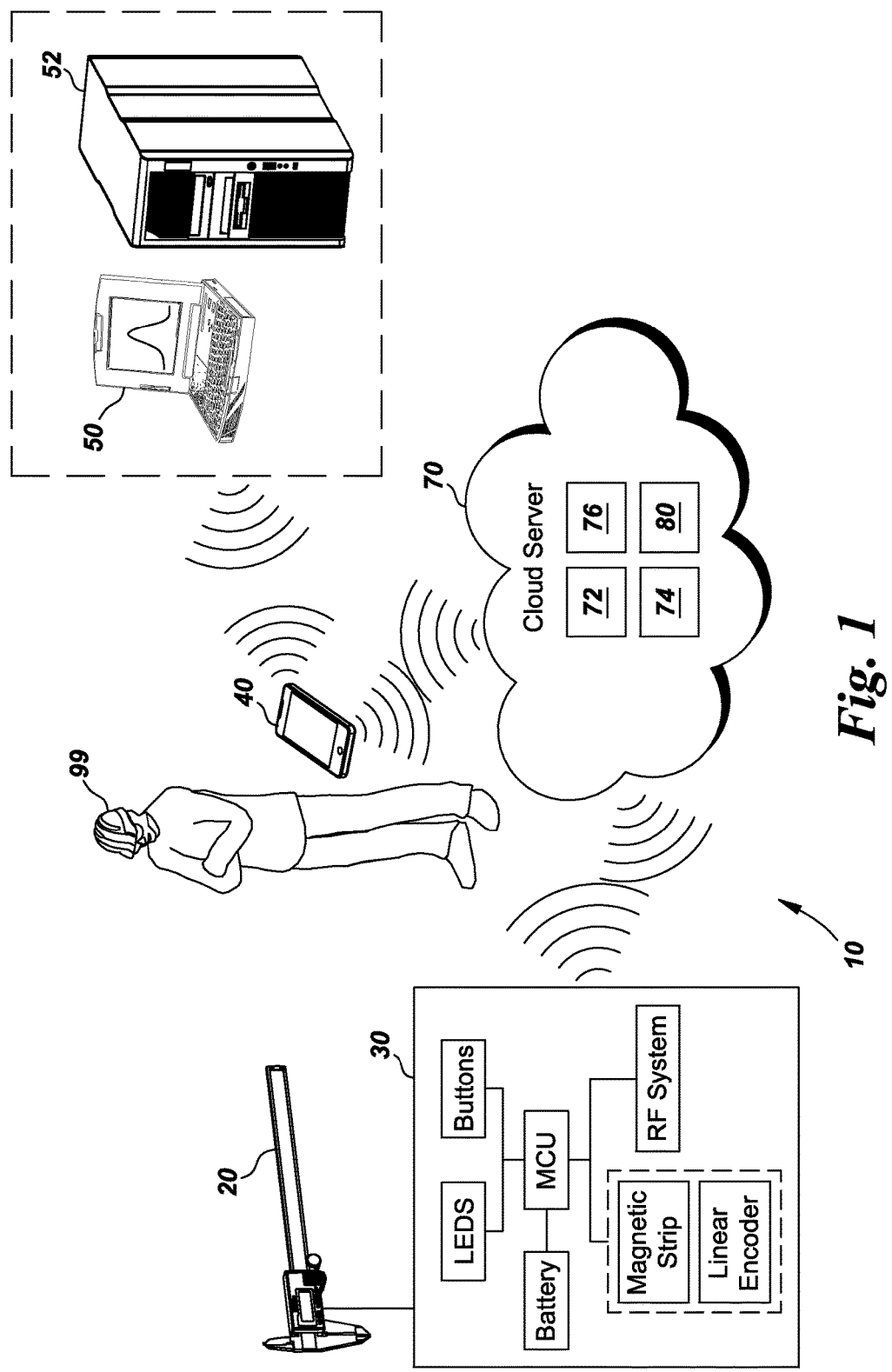
FIG. 1 is a schematic diagram of an exemplary environment for using the system architecture for wireless metrological device, according to aspects of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention are a system architecture and ecosystem for providing services and capabilities to different metrological devices such as gauges, sensors, or tools. The standardization of this architecture will allow for different tools and measurement systems from different manufacturers to connect wirelessly to mobile or non-mobile devices, including but not limited to phones, tablets, desktop computers, laptops, etc. By standardizing the services provided by this common architecture, a system of systems can be made where multiple metrological devices can communicate data wirelessly to one central hub using one of these standardized services, including but not limited to a generic metrological data service, a generic file sharing service, a generic physiological and environmental data service, and the like. These services can be used with multiple wireless protocols, including but not limited to WiFi 802.11 variants, Bluetooth, Bluetooth Low Energy (BLE), 802.15.4 variants (including Zigbee and 6LoWPAN), and proprietary protocols. Bluetooth Low Energy (BLE) is also known by terms including Bluetooth 4.0 or Bluetooth Smart. Bluetooth is a trademark of the Bluetooth Special Interest Group (SIG).

Aspects of the present invention incorporate features from commonly assigned, U.S. patent Ser. No. 14/048,930, filed Oct. 8, 2013, entitled "Methods and Systems for a Universal Wireless Platform for Asset Monitoring", incorporated herein by reference in its entirety. (Hereinafter "Universal Wireless Platform"). The instant document pertains to the system architecture of such a Universal Wireless Platform and details some of the different capabilities of such a Universal Wireless Platform.

This metrological system architecture provides a defined standard and protocols for wireless metrological data collection from multiple devices. The ability to wirelessly connect to multiple devices from multiple manufacturers which inherently use non-standard or proprietary protocols for hardwired connectivity enables the formation of a network of connected devices, each of which can provide data to the central hub for advanced processing and multivariate analysis which was previously not possible.

Another problem potentially solved by this invention is software development and maintenance requirements that grow with increasing device complexity and diversity. The invention creates an abstraction around the connected devices, such that their data are reported through a standard mechanism that is both flexible and extensible. The software subcomponents of the architecture that reside within the central/hub application perform necessary programmatic and algorithm preprocessing before submitting final data to the high-level software application.

The services provided by the architecture, such as data collection, file sharing, over-the-air updates, and data collection modes allow for increased workflow with regards to data collection and/or tool software or firmware updates. Other services such as the physiological and environmental data service allow for other functionalities that may be nonspecific to the tools, such as wireless signal strength, loss prevention through the use of buzzers, LEDs, vibrations, and the like.

This architecture allows metrological devices to wirelessly connect with one central hub/network to enable the services previously describe in the above sections—the standard services enable higher functionality and increased efficiency due to improved workflow and the ability to collect data from multiple devices from different manufacturers.

The system architecture additionally provides services related to tool management and firmware updates through the use of over-the-air updates. The hub device will have the ability to detect the firmware of the tool(s) currently connected to the device, search through a library of firmwares compatible with the tool(s), and automatically update connected tool(s) to updated versions of the firmware as necessary, provided a complete yet generic ecosystem for connecting tools to a data collection device, collecting data wirelessly from said tools, and managing and updating those tools as needed through the use of over-the-air firmware updates.

This system of metrological systems architecture provides multiple standard services, including a generic sensor data interface allowing different metrological devices from multiple manufacturers to communicate wirelessly and transmit sensor data to a master/hub device (such as tablet or phone) using a single standard. Additionally, a file sharing service allows other devices to send larger amounts of data over a standard unique to this architecture.

In at least some embodiments, this architecture allows the central or master/hub device to act as a very real extension of the metrological sensing device. This coupling provides computing and memory resources to the metrological sensing device that are not otherwise available, and in some cases greatly increases the speed and/or precision of the metrological sensing device.

In at least some embodiments, the architecture is implemented as modular subcomponents within both the embedded firmware of the metrological sensing device as well as within a software platform and API within the software application on the master/hub device. These subcomponents support the above-described data and file services, as well as additional data services, ensuring proper handshake, transmission, and processing before the final data are submitted through the API to the application software.

These services are predefined standards that allow for interoperability with multiple devices providing multiple functionalities—in their current implementation they are coded onto a microcontroller using Bluetooth Low Energy for wireless connectivity. The services and standards could however be adapted for multiple wireless protocols.

The hub-to-sensor/tool ecosystem may also include a system for updating and managing connected device firmware through over-the-air updates through the use of a cloud-based firmware database.

The architecture does not include any restrictions with regards to connecting tools/sensors to multiple hub devices as other wireless services do traditionally (an example of this is the Bluetooth pairing/bonding process in which a paired device is perpetually tied to a hub until manually unpaired). In this system devices will be able to connect to multiple hubs without requiring the user to explicitly unpair the device from a previously connected hub.

Referring to the figures, FIG. 1 is a schematic diagram of an environment that can typically use the system architecture for wireless metrological devices, in accordance with aspects of the present invention. As shown, and as partially discussed for example in the aforementioned related Universal Wireless Platform, the environment 10 comprises elements including, but not limited to, a wireless metrological device 20 having communication interface 30, a mobile computing device 40, a cloud server 70, a user (or field inspector) 99, an element(s) in need of measurement (not shown), and, optionally, a recording computing device 50 and/or server 52. As depicted, various elements are in wireless communication with each other.

The details of the wireless communication interface 30 is described in detail in other commonly assigned, previously filed documents including the Universal Wireless Platform.

The mobile computing device 40 is also referred herein as a hub/collection device, a hub and collection device, a BLE Master device, and similar.

The metrological device 20 that can use the system architecture of the present invention may comprise at least one of a taper gauge, a digital indicator, calipers, a micrometer, a depth gauge, a protractor, a digital voltmeter and the like.

Figure 2:
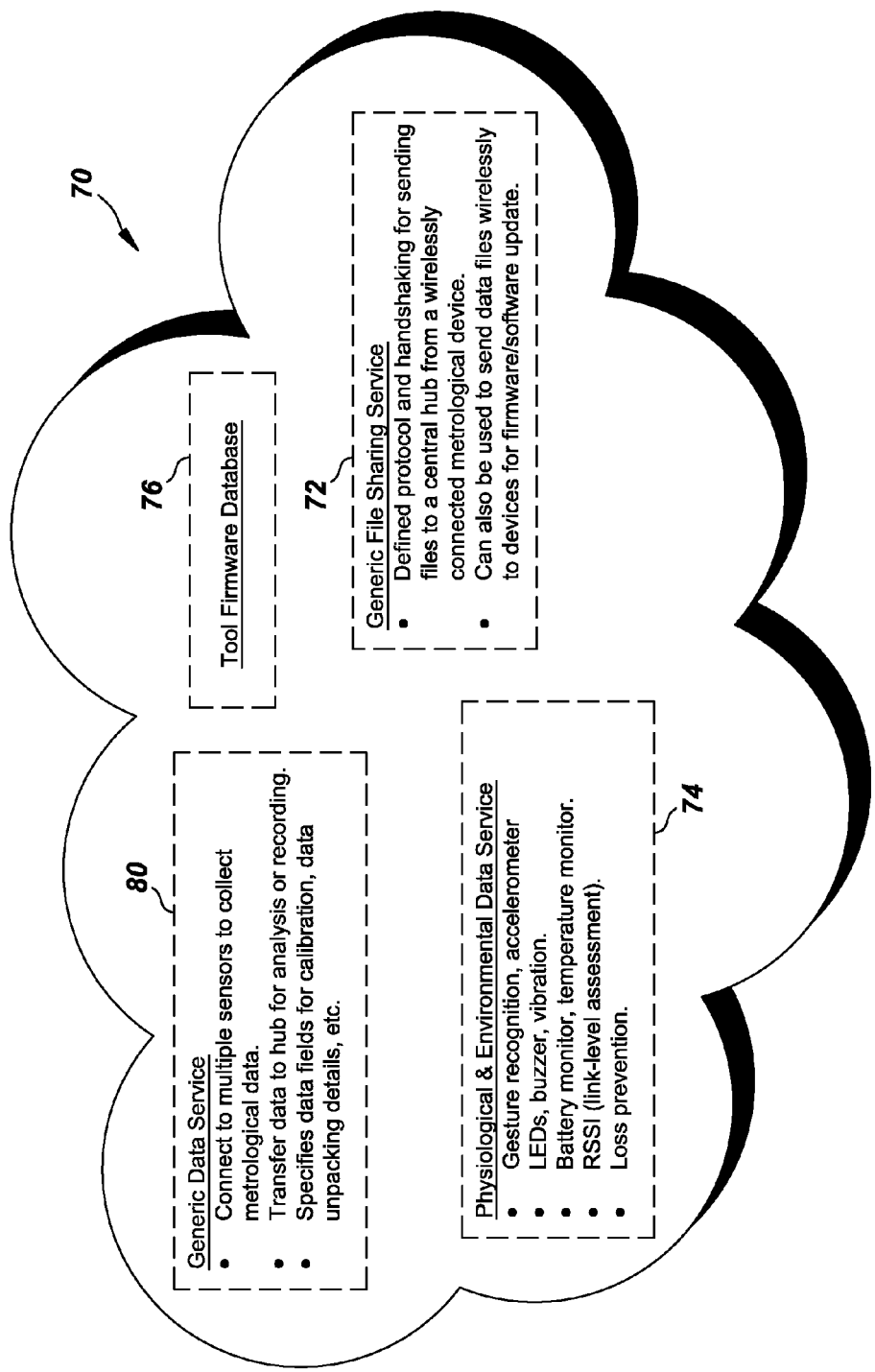
FIG. 2 is a schematic diagram of various types of data and file services used in the system architecture for wireless metrological devices, according to aspects of the present invention.

Referring to FIG. 2, a schematic diagram illustrates various data and file sharing type services according to aspects of the present invention. The system architecture allows for, as shown in the example, at least three different services to be shared from a cloud server 70 with the metrological device (e.g., tool) 20 (FIG. 1). The cloud server 70 may comprise a generic file sharing service 72, a physiological & environmental data service 74, a tool firmware database 76, and/or a generic data service 80. In this manner, virtually any metrological device 20, when employing the system architecture, can wirelessly communicate with other metrological devices, the remote receiver(s), and/or hub/collection device(s).

The generic file sharing service 72 may include defined protocol and "handshaking" for sending files to a central hub from a wirelessly connected metrological device 20 (FIG. 1). The file sharing service 72 may also be used to send data files wirelessly to metrological devices 20 for firmware/software update(s) from a tool firmware database 76.

The physiological & environment data service 74 may comprise gesture recognition and accelerometers; LEDs, buzzer, and vibration information; battery and temperature monitoring information; RSSI (Received Signal Strength Indication) (link-level assessment); and/or loss prevention information.

The generic data service 80 provides for the connection to multiple (one or more) metrological devices so as to collect metrological data. The data service 80 may comprise specific data fields for calibration, data unpacking details, and the like. The data service 80 may also allow for the transferring of data to the hub for analysis or recording.

An example of the services/capabilities provided through the generic data service 80 is the ability to request data from the device wirelessly from the hub as well as collect data in different data collection modes. These modes include but are not limited to the following: 1) A "normal" mode in which a measurement from the sensor/tool to the hub due to an action at the tool side. 2) A "query" mode in which the hub initiates a request to connected device(s) for data to be sent wirelessly to the hub. 3) A "burst" mode in which a single data request will enable a user-defined number of measurements to be taken and sent back to the hub consecutively with a user-defined sampling rate. 4) A "stream" mode in which a single data request will enable continuous measurements to be taken and sent back to the hub consecutively with a user-defined sampling rate until a user cancels the request.

Figure 3:
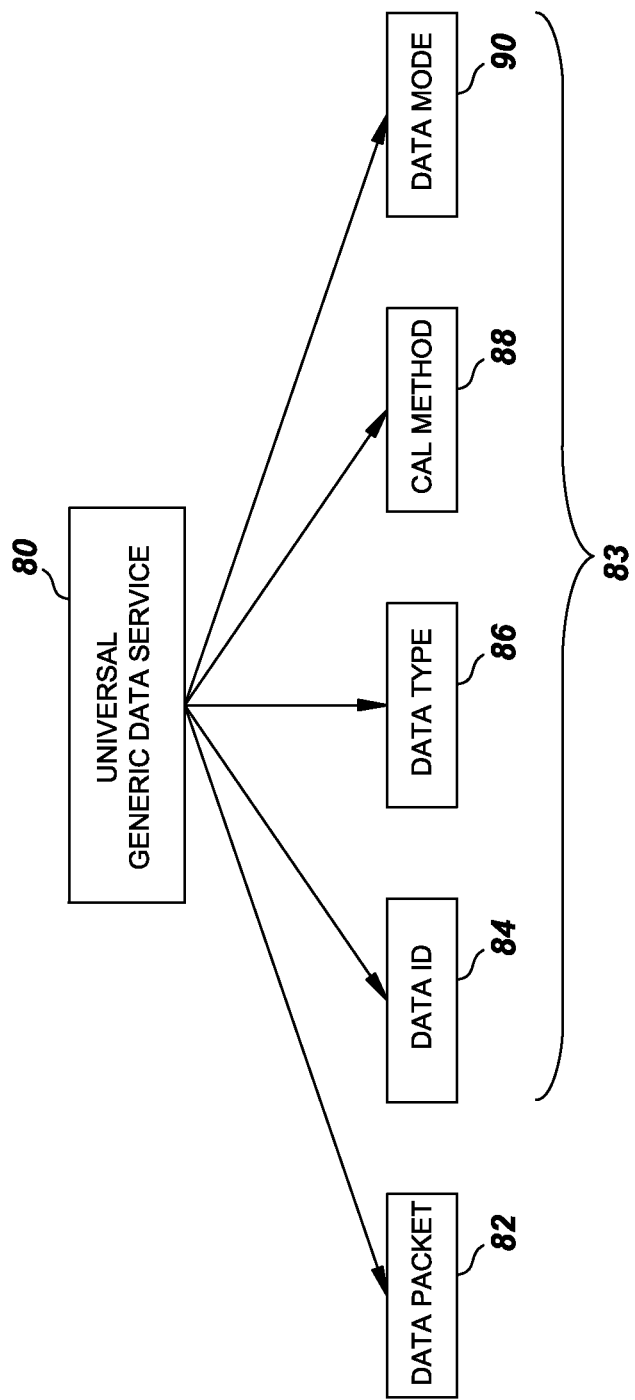
FIG. 3 is a schematic diagram of an exemplary data service profile of the generic data service of FIG. 2.

Referring to FIG. 3, a schematic diagram of an exemplary data service profile 80 for the generic data service 80 of FIG. 2 is shown. The universal generic data service may comprise raw data (e.g., measurement(s)), or a Data Packet 82 and at least one other data descriptor 83. The data descriptor 83 is affiliated with the data (e.g., measurement) provided.

The Data Packet 82 represents the raw data bytes being sent to the hub device 40. Data Packet 82 characteristic represents a raw measurement taken by a metrological system to be sent to the hub device (e.g., BLE Master Device) 40. A maximum size of this characteristic may be 20 bytes (i.e., the maximum characteristic length as allowed by the BLE specification). The characteristic is configured with the Notify property, whereby any changes to this characteristic trigger an automatic update to the BLE Master Device 40.

As illustrated the universal, or generic, data service 80 may parse the obtained data with a plurality of data descriptors 83, or characteristics. The data descriptors 83, or characteristics, may include characteristics and information on, for example, how the raw data is grouped; how the data, once grouped, should be parsed; how the data, once parsed, should be processed; changing the way measurement is collected, and the like. The data descriptors 83 may comprise, for example, a Data Packet 82, Data ID 84, Data Type 86, Cal (or Calibration) Method 88, and Data Mode 90. The data descriptors 83 in an embodiment may be in this specific order described here.

The Data ID 84 characteristic represents how each byte of raw data in the Data Packet 82 characteristic should be grouped by any data collection software. The Data ID 84 characteristic is used to inform the BLE Master Device 40 how each byte of data should be grouped in the Data Packet 82 characteristic. For example, if the raw data sent in the Data Packet 82 characteristic consists of 2 16-bit integers, the Data ID 84 characteristic would be used by the master to indicated that he first 2 bytes of the Data Packet 82 should be grouped together, or concatenated, into a single 16-bit number. Likewise, the Data ID 84 would indicate that the 3$^{rd}$ and 4$^{th}$ bytes should also be concatenated into a 16-bit number. The BLE Master 40 will look at this characteristic value whenever it receives a measurement from Data Packet 82 through the Notify property. An example of this is as follows:

| Data Packet: | 0xF5 | 0x67 | 0x89 | 0xab |
| Data ID: | 0x01 | 0x02 | 0x02 | 0x02 |

The BLE Master 40 would then interpret the incoming measurement as two separate numbers, 0xF567 and 0x89ab. Note that when concatenating bytes in this fashion, Most Significant Byte (MSB) order, or Big Endian, is assumed in the Data Packet array. The maximum length of the Data ID 84 characteristic is 20 bytes, and should be set to both the Notify and Read property, so that the hub 40 will get any updates or changes to this characteristic automatically. Note that this value should be updated prior to updating the Data Packet 82 characteristic to ensure the raw data is parsed correctly.

The Data Type 86 represents how the data, once grouped according to Data ID 84, should be parsed. Similar to the Data ID 84 characteristic, the Data Type 86 characteristic is used to inform the BLE Master 40 how grouped Data Packet 82 bytes(s) should be interpreted or parsed to produce a measurement. Possible values for Data Type 86 characteristic are fixed and include enumerated options such as NO_DATA, INTEGER, ASCII, BOOLEAN, UNSIGNED INTEGER, FLOAT, BCD, and the like. In the aforementioned, the Data Type 86 characteristic would be used to indicate that the data bytes, once grouped together by Data ID 84, should be interpreted as either signed or unsigned integers. As shown, for example, as follows:

| Data Packet: | 0xF5 | 0x67 | 0x89 | 0xab |
| Data ID: | 0x01 | 0x01 | 0x02 | 0x02 |
| Data Type: | 0x03 | 0x03 | 0x02 | 0x02 |

Note that, in the aforementioned example, that 3 is the enumerated value for INTEGER and 2 is the enumerated value for UNSIGNED INTEGER.

The data bytes could then be converted into 2 16-bit signed and unsigned integers. In this example, these numbers become −2713 and 35243, respectively. The maximum length of the Data Type 86 characteristic is 20 bytes and should be set to both the Notify and Read property. Note that this value should be updated prior to updating the Data Packet 82 characteristic (along with the Data ID 84) to ensure the raw data is parsed correctly.

The Calibration Method 88 represents how the data should be processed once it is parsed by the BLE Master, or hub device, 40. The Calibration Method 88 is used to provide additional information, if required, to the BLE Master 40 in interpreting Data Packet 82 characteristic values. In general, the Calibration Method 88 characteristic will only be used by metrological devices 20 which require additional processing on the BLE master (e.g., iPad) 40 in order to generate a measurement value. For example, a digital feeler gauge, provided by Assignee, requires a calibration file to be generated and stored on BLE Master 40 device(s) in order to interpret the raw data into a single measurement. The Calibration Method 88 characteristic has a number of possible enumerated values, such as for example, PASS_THROUGH (i.e., meaning no processing needed), LINEAR, LINEAR_WITH_WRAP, RAW_PHASE, SYNTHESIS, and the like. The most common value for simple metrological devices 20 typically would be PASS_THROUGH, which the BLE Master 40 interprets to mean that no additional processing is required and that received Data Packet 82 values can be interpreted directly as measurement values. The maximum length of the Calibration Method 88 characteristic is 20 bytes. It should be set to have both Read and Notify properties.

The examples shown below illustrate how each of the previous characteristics (e.g., 82, 84, 86, 88) could be configured in order to send a measurement from metrological device(s) 20. Note that some current metrological devices 20 currently send an ASCII stream of data of the connected BLE slave device, and this data is copied directly into the Data Packet 82 characteristic upon receiving a measurement over the UART.

Example S_Mike Pro measurement: +0.46825 inches

Raw ASCII data receive by slave: 0x2B 0x30 0x2E 0x34 0x36 0x38 0x32 0 x35

| Data Packet: | 0x2B | 0x30 | 0x2E | 0x34 | 0x36 | 0x38 | 0x32 | 0x35 |
|---|---|---|---|---|---|---|---|---|
| Data ID: | 0x01 | 0x01 | 0x01 | 0x01 | 0x01 | 0x01 | 0x01 | 0x01 |
| Data Type: | 0x05 | 0x05 | 0x05 | 0x05 | 0x05 | 0x05 | 0x05 | 0x05 |
| Cal Method: | 0x00 | 0x00 | 0x00 | 0x00 | 0x00 | 0x00 | 0x00 | 0x00 |

Note that 4 is the enumerated value for ASCII data for Data Type 86 and that 0 is the enumerated value for PASS_THROUGH for Calibration Method 88.

For the aforementioned example, the length of the Data Packet 82 is 8 bytes, although the Data Packet 82 characteristic has a fixed length of 20 bytes. The remaining 12 bytes for each of the above characteristics should be set to 0. This holds true for all scenarios where portions of the 20 bytes are unused; the remaining bytes should be set to 0 to prevent the BLE Master 40 from incorrectly parsing.

The Data Mode 90 characteristic is used to change the manner in which measurements are collected. This enables the MLE Master 40 to ask for, or "query", a connected device for a measurement (as opposed to pushing the "Take Measurement" button the metrological device 20 itself). An example of the QUERY mode would be pushing a button on the BLE Master 40 (e.g., iPad) to take a measurement wirelessly. Other possible options for Data Mode 90 characteristic are PUSH, STREAM, or BURST. The PUSH mode, for example, may be the default value of the Data Mode 90 characteristic and specifies that the device is in a state where a button push on the physical metrological device 20 will send a single measurement.

If the Data Mode 90 characteristic is changed by writing the STREAM value to the device, the measurement device 20 will be put into a mode where a single button push will toggle (on or off) continuous streaming of data to the BLE Master 40 whereby a measurement is taken on a fixed interval.

Similarly, changing the Data Mode 90 characteristic to BURST will put the device into a mode where a single button push will cause a predefined number of measurements to be taken quickly and sent to the BLE Master 40. This characteristic's property should be set to Write.

The Universal Data Service 80 could use any quantity from one to all four of the data descriptors 83 when sending and receiving data. For example, the values of the data descriptors 83 could stay constant during the sending/receiving of any and all measurements. Alternatively, the values of the data descriptors 83 could change during the sending/receiving of measurements. Similarly, the values of the data descriptors 83 could change during the sending/receiving of measurements depending on the type and/or brand of tool 20 being used.

Data Service Specifications

Listed herein are exemplary Universally Unique Identifiers (UUID) currently in the Data Service Profile and the enumerated values used for different Data Service characteristics (e.g., 82, 84, 86, 88, 90). Table 1 (below) provides a summary of the characteristics and the UUIDs used by the application. (Table 1 lists characteristics for Data Service UUID: 0xFFC0)

| Data Service UUID: 0xFFC0 | | | | | |
|---|---|---|---|---|---|
| Characteristic | Characteristic UUID | Characteristic Qualifier | Mandatory Properties | Optional Properties | Security |
| Data Packet | 0xFFC1 | C.1 | Notify | Read | None |
| Data ID | 0xFFC2 | C.1 | Notify | Read | None |
| Data Type | 0xFFC3 | C.1 | Notify | Read | None |
| Calibration Method | 0xFFC4 | C.1 | Notify | Read | None |
| Data Mode | 0xFFC5 | C.1 | Write | | None |

Tables 2-4 show enumerated values which are supported for each of the data parsing/configuration characteristics.

Table 2 lists characteristics for Data Type 86 UUID: 0xFFC3:

| Data Type UUID: 0xFFC3 | |
|---|---|
| Characteristic Value | Enumerated Value |
| NO DATA | 0x00 |
| BOOLEAN | 0x01 |
| UNSIGNED INT | 0x02 |
| SIGNED INT | 0x03 |
| ASCII | 0x05 |
| BINARY_CODED_DECIMAL | 0x06 |
| RESERVED | 0xFF |

Table 3 lists characteristics for Cal Method 88 UUID: 0xFFC4:

| Method UUID: 0xFFC4 | |
|---|---|
| Characteristic Value | Enumerated Value |
| NO DATA | 0x00 |
| PASS THROUGH | 0x01 |
| LINEAR | 0x02 |
| LINEAR WITH WRAP | 0x03 |
| RAW PHASE | 0x04 |
| SYNTHESIS | 0xFE |
| RESERVED | 0xFF |

Table 4 lists characteristics for Data Mode 90 UUID: 0xFFC4:

| Data Mode UUID: 0xFFC5 | |
|---|---|
| Characteristic Value | Enumerated Value |
| PUSH | 0x00 |
| QUERY | 0x01 |
| STREAM | 0x02 |
| BURST | 0x03 |

Figure 4:
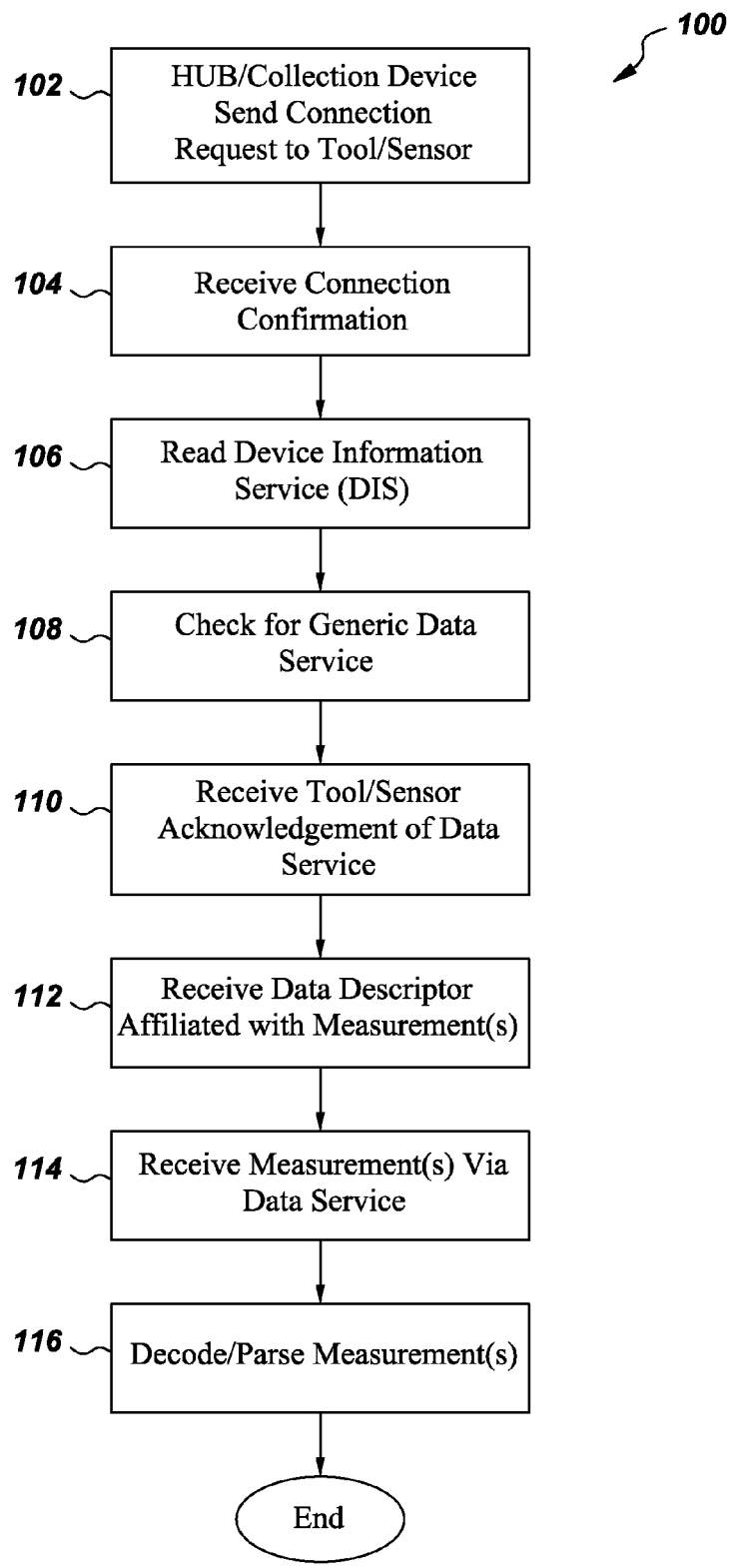
FIG. 4 is a flowchart of a method of wireless communication, according to aspects of the present invention.

Referring to FIG. 4, a flowchart of an exemplary method of communication is depicted. The method 100 shown is for a hub or collection device 40 (FIG. 1) in wireless communication with at least one metrological device 20 (FIG. 1). The method 100 starts with pairing of the hub/collection device 40 with the metrological device 20 wherein, at 102, the hub/collection device 40 sends a connection request to the metrological device 20. At 104, the hub/collection device 40 receives a connection confirmation from the metrological device 20. At 106, the hub/collection device 40 reads Device Information Service (DIS). At 108, the hub/collection device 40 checks for generic data service 80 (FIG. 3). Optionally, the hub/collection device 40 checks/verifies if the firmware version is the most recent, up-to-date version. If the firmware is not the latest, the hub/collection device 40 retrieves the latest firmware version from the tool firmware database 76 (FIG. 1) or device memory. At 110, the hub/collection device 40 receives acknowledgement of data service. At 112, the hub/collection device 40 then receives at least one data descriptor (FIG. 3) affiliated with a measurement(s) from the metrological device 20. The hub/collection device 40 receives measurement(s) (data packet 82 at FIG. 3) via data service 80 (FIG. 2) at 114. At 116, the hub/collection device 40 decodes and parses the measurement(s) received. The reading of DIS (i.e., 106) may include receiving a DIS message from the at least one wireless metrological device 20.

Figure 5:
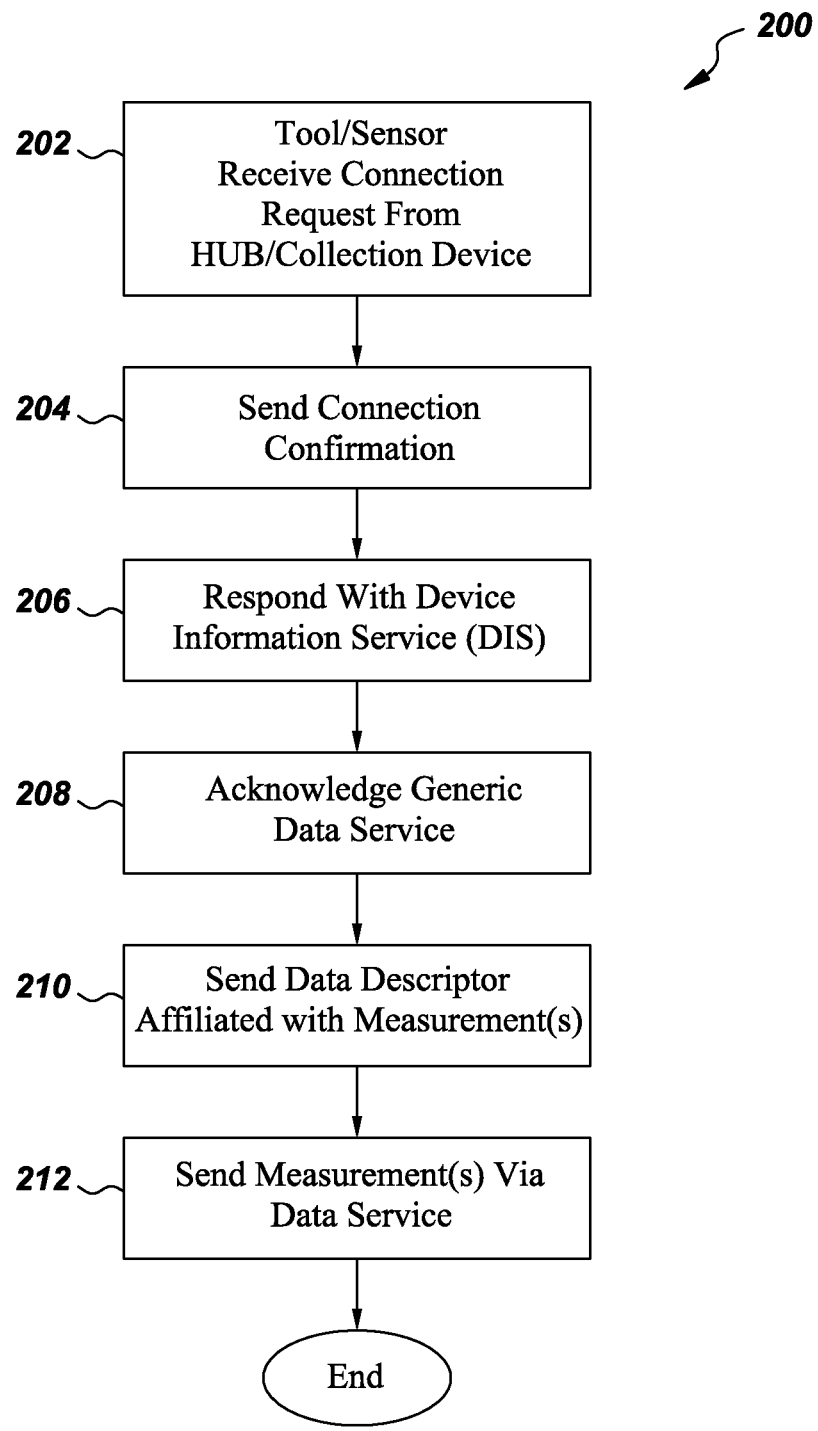
FIG. 5 is a flowchart of another method of wireless communication, according to aspects of the present invention.

Referring to FIG. 5, a flowchart of an exemplary method of communication is depicted. The method 200 shown is for at least one metrological device 20 (FIG. 1) in wireless communication with the hub or collection device 40 (FIG. 1). The method 200 starts with pairing of the hub/collection device 40 with the metrological device 20 wherein, at 202, the metrological device 20 receives a connection request from the hub/collection device 40. At 204, the metrological device 20 sends a connection confirmation to the hub/collection device 40. At 206, the metrological device 20 responds with Device Information Service (DIS). At 208, the metrological device 20 acknowledges the generic data service 80 (FIG. 3). At 210, the metrological device 20 sends at least one data descriptor 83 affiliated with a measurement(s) (see FIG. 3) to the hub/collection device 40. The metrological device 20 sends measurement(s) (data packet 82 at FIG. 3) via data service 80 (FIG. 2) at 212. Step 206 may include, for example, the metrological device 20 sending a DIS message to the hub/collection device 40.

Example of Generic File Sharing Data:

The following description is an example of a simple transfer protocol for the integration of UBLE and an exemplary Tool. That is, the following description may be employed as one example of a type of generic file sharing service 72 as depicted in FIG. 2.

The following is to identify the requirements and outline an example of a file transfer protocol to be used for integration between, for example, Universal Bluetooth Low Energy (UBLE) hardware and the exemplary Tool currently used for example for turbine blade gap measurements. The exemplary Tool is designed such that all measurements recorded during a session/job can be exported to a USB flash drive for transfer to external PCs. The goal of this integration effort is to replace the flash drive medium with a seamless wireless transfer between the exemplary Tool and mobile device, such as an IPAD™ (IPAD is a trademark of Apple Corporation), application using an UBLE platform. Any data exported to the mobile device could then be automatically uploaded to a database server or analyzed/archived using a custom mobile device application.

Example of requirements and criteria for successful integration of the UBLE board with the exemplary Tool are defined below:

The exemplary Tool must be able to initiate and successfully complete a file transfer to an attached BLE dongle from the main program GUI. This includes checking all serial COM ports for the presence of the UBLE dongle, confirming that it is ready for a file transfer to an attached BLE master device (e.g., IPAD™), and finally transferring the binary data file across the serial link to the attached BLE dongle for upload to the BLE master.

The IPAD™ must be able to initiate and successfully complete a file transfer from a BLE slave that is attached to an exemplary Tool. This includes sending a request to the BLE slave to check for an attached exemplary Tool. If the response indicates that a 6-Point Tool is attached and has data for download, the BLE slave will initiate a download of the binary data file across the serial link and upload the file to the BLE master.

This section defines the settings, packet structure, and commands that will be used to communicate over a serial link between the exemplary Tool and UBLE board. The table below defines the RS-232/UART serial port properties:

| Property | Value |
|---|---|
| Baud Rate (bps) | 9600 |
| Data Bits | 8 |
| Parity | None |
| Stop Bits | 1 |
| Flow Control | None |

The serial communication between the UBLE and exemplary Tool will be asynchronous, meaning there is no flow control between the two devices and they are able to send data back and forth with only simple control mechanisms, reducing complexity and overhead. Data will be communicated in a packetized format. The structure of each packet is shown the below STP Packet Structure:

| <START> | <SIZE> | <OPCODE> | PAYLOAD DATA | <CHECKSUM> | <END> |
|---|---|---|---|---|---|
| Byte 1 | Byte 2 | Byte 3 | Bytes 4 – X (max 80 bytes) | Byte X + 1 | Byte X + 2 |

Byte descriptions and definitions are as follows, assuming a payload size of 80 bytes:

Byte 1—START BYTE:

Always set to 0x01 (ASCII code for SOH—start of heading). This will indicate the start of a packet Byte 2—SIZE BYTE:

The length of bytes 3→(X+2). Maximum payload size is 80 bytes, therefore maximum length is 83 (including the OPCODE, CHECKSUM, and END bytes). Minimum length is 4 bytes (OPCODE, 1 data byte, CHECKSUM, and END bytes).

Byte 3—OPCODE BYTE:

The OPCODE byte defines the type of packet being transmitted. The table below defines the different opcodes and their usage/meaning.

| Hex code | Command | Description |
| --- | --- | --- |
| 0x05 | ENQ—Enquiry | Used to confirm the presence of a communications link, a simple acknowledge command should be returned. Can be sent by UBLE or exemplary tool—usually used to indicate that a device is "ready." If a NACK is returned the device will abort it's task. The UBLE will return a NACK if no BLE link is present. This command is sent by the exemplary Tool directly prior to sending a data file. This command is sent by the UBLE as a request for a data file. |
| 0x02 | STX—Start of Text | Used to indicate that payload data is being sent, always sent from exemplary Tool to UBLE. This command will be sent after a successful ENQ-ACK sequence. |
| 0x23 | ETB—End Transmission Block | Used to indicate that a data transmission is completed and return the UBLE to an idle state. |
| 0x06 | ACK—Acknowledge | Used to confirm availability or successful packet transfer. An ACK response to an ENQ indicates availability for data file transfer, and ACK response to anything else indicates packet was received successfully. |
| 0x21 | NACK—Negative Acknowledge | Used to indicate unavailability or unsuccessful packet transfer. A NACK will cause a packet retransmission or indicate that no BLE link is available (on ENQ commands) |

Bytes 4-23—PAYLOAD DATA:

The payload data bytes have a minimum length of 1 byte and a maximum length of 80 bytes. The payload data byte will be length 1 and have value 0x00 for all packet types except packets with opcode STX—the payload in that case is the raw binary file being transferred from the exemplary Tool to an IPAD™

Byte 24—CHECKSUM BYTE:

The check sum byte will be used for error checking and will be calculated using the following formula:

CHECKSUM=0xFF−LSB of (ΣDATA BYTES+OP-CODE)

For example, if the OPCODE and PAYLOAD DATA consisted of the following bytes, the checksum would be calculated as below:

01 01 50 01 00 48 65 6C 6C 6F

01+01+50+01+00+48+65+6C+6C+6F=0x247→LSB=0x47

Checksum=0xFF−0x47=0xB8

The checksum of a packet can be easily verified by adding all of the bytes including the checksum and verifying that the Least Significant Byte (LSB) is 0xFF. For example, the above packet and checksum is verified below:

01+01+50+01+00+48+65+6C+6C+6F+B8=2FF→LSB=0xFF

Byte 25—END BYTE:

Always set to 0x04 (ASCII code for EOH—end of transmission). This will indicate the end of a packet.

Example communication sequences are shown below for different types of data transfer requests (exemplary Tool to IPAD™ & IPAD™ to exemplary Tool).

EXAMPLE: exemplary Tool Sends Data File to IPAD™
exemplary Tool (enquiry): 01 04 05 00 FA 04
UBLE (ack): 01 04 06 00 F9 04
exemplary Tool (send data): 01 17 02 01 02 03 04 05 06 07 08 09 10 11 12 13 14 15 16 17 18 19 20 E5 04
UBLE (ack): 01 04 06 00 F9 04
exemplary Tool (send data): 01 17 02 21 22 23 24 25 26 27 28 29 30 31 32 33 34 35 36 37 38 39 40 65 04
UBLE (ack): 01 04 06 00 F9 04
exemplary Tool (end tx): 01 04 23 00 DC 04
UBLE (ack): 01 04 06 00 F9 04
EXAMPLE: IPAD™ Requests exemplary Tool Sends Data File
UBLE (enquiry): 01 04 05 00 FA 04
exemplary Tool (ack): 01 04 06 00 F9 04
exemplary Tool (send data): 01 17 02 01 02 03 04 05 06 07 08 09 10 11 12 13 14 15 16 17 18 19 20 E5 04
UBLE (ack): 01 04 06 00 F9 04
exemplary Tool (send data): 01 17 02 21 22 23 24 25 26 27 28 29 30 31 32 33 34 35 36 37 38 39 40 65 04
UBLE (ack): 01 04 06 00 F9 04
exemplary Tool (end tx): 01 04 23 00 DC 04
UBLE (ack): 01 04 06 00 F9 04

The standard timeout for receiving an ACK/NACK after a packet is sent is 500 ms. If no response is received within this amount of time both devices should abort the current task and return to an idle state. This simple set of commands and packet structure satisfies the requirements of being able to request data from the IPAD™ as well as initiate data upload from the exemplary Tool.

This system architecture which enables use of these various services ultimately allows for higher end analytics, as compared to merely traditional data logging. Amongst the types of analytics that may be offered via the use of this system architecture may be a "suite" including trend analysis; visual inspection technology; use of imaging (e.g., pictures); and the like.

According to another embodiment of the present invention, a system architecture is such that at least two of the plurality of metrological devices are from a different manufacturer.

According to another embodiment of the present invention, the wireless protocol may be BLE.

According to one embodiment, a computer-based method by a wireless metrological device, the wireless metrological device including a wireless communication interface configured to communicate with at least one mobile computing device, the method comprises: receive a connection request from the at least one mobile computer device; send a connection confirmation to the at least one mobile computer device; respond to the at least one mobile computer with Device Information Service (DIS); acknowledge to the at least one mobile computer a universal generic data service; send a data descriptor to the at least one mobile device, wherein the data descriptor is affiliated with a measurement; and send a data packet comprising the measurement using the universal generic data service to the at least one mobile computing device.

According to one embodiment, a computer-based method by a mobile computing device, the mobile computing device including a wireless communication interface capable of communicating with at least one wireless metrological device, the method comprises: send a connection request to the at least one wireless metrological device; receive a connection confirmation from the at least one wireless metrological device; read Device Information Service; check for a generic data service from the at least one wireless metrological device; receive from the at least one wireless metrological device acknowledgement of the generic data service; receive from at least one wireless metrological device a data descriptor, wherein the data descriptor is affiliated with a measurement; receive the measurement via the generic data service; and decode and parse the received measurement.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

The present invention has been described in terms of the preferred embodiment, and it is recognized that equivalents, alternatives, and modifications, aside from those expressly stated, are possible and within the scope of the appending claims.

What is claimed is:

1. A computer-based method by a wireless metrological device, the wireless metrological device including a wireless communication interface configured to communicate with at least one mobile computing device, the method comprising:
   receive a connection request from the at least one mobile computer device;
   send a connection confirmation to the at least one mobile computer device;
   respond to the at least one mobile computer with Device Information Service (DIS);
   acknowledge to the at least one mobile computer a universal generic data service;
   send a data descriptor to the at least one mobile device, wherein the data descriptor is affiliated with a measurement; and
   send a data packet comprising the measurement using the universal generic data service to the at least one mobile computing device, wherein the wireless metrological device comprises a taper gauge.

2. A computer-based method by a wireless metrological device, the wireless metrological device including a wireless communication interface configured to communicate with at least one mobile computing device, the method comprising:
   receive a connection request from the at least one mobile computer device;
   send a connection confirmation to the at least one mobile computer device;
   respond to the at least one mobile computer with Device Information Service (DIS);
   acknowledge to the at least one mobile computer a universal generic data service;
   send a data descriptor to the at least one mobile device, wherein the data descriptor is affiliated with a measurement; and
   send a data packet comprising the measurement using the universal generic data service to the at least one mobile computing device, wherein the wireless metrological device comprises one of calipers, a micrometer, a depth gauge, a protractor and a digital voltmeter.

3. A computer-based method by a mobile computing device, the mobile computing device including a wireless communication interface capable of communicating with at least one wireless metrological device, the method comprising:
   send a connection request to the at least one wireless metrological device;
   receive a connection confirmation from the at least one wireless metrological device;
   read Device Information Service;
   check for a generic data service from the at least one wireless metrological device;
   receive from the at least one wireless metrological device acknowledgement of the generic data service;
   receive from at least one wireless metrological device a data descriptor, wherein the data descriptor is affiliated with a measurement;
   receive the measurement via the generic data service; and decode and parse the received measurement, wherein the wireless metrological device comprises a taper gauge.

4. A commuter-based method by a mobile computing device, the mobile computing device including a wireless communication interface capable of communicating with at least one wireless metrological device, the method comprising:
   send a connection request to the at least one wireless metrological device;
   receive a connection confirmation from the at least one wireless metrological device;
   read Device Information Service;
   check for a generic data service from the at least one wireless metrological device;
   receive from the at least one wireless metrological device acknowledgement of the generic data service;
   receive from a t least one wireless metrological device a data descriptor, wherein the data descriptor is affiliated with a measurement;
   receive the measurement via the generic data service; and decode and parse the received measurement, wherein the wireless metrological device comprises one of calipers, a micrometer, a depth gauge, a protractor and a digital voltmeter.

* * * * *